United States Patent
Song et al.

(10) Patent No.: US 11,888,156 B2
(45) Date of Patent: Jan. 30, 2024

(54) NEGATIVE ELECTRODE ACTIVE MATERIAL, NEGATIVE ELECTRODE INCLUDING NEGATIVE ELECTRODE ACTIVE MATERIAL, AND LITHIUM SECONDARY BATTERY INCLUDING NEGATIVE ELECTRODE

(71) Applicant: LG CHEM, LTD., Seoul (KR)

(72) Inventors: Jun Hyuk Song, Daejeon (KR); Oh Byong Chae, Daejeon (KR); Je Young Kim, Daejeon (KR); Yong Ju Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 660 days.

(21) Appl. No.: 17/050,224

(22) PCT Filed: May 9, 2019

(86) PCT No.: PCT/KR2019/005579
§ 371 (c)(1),
(2) Date: Oct. 23, 2020

(87) PCT Pub. No.: WO2019/221449
PCT Pub. Date: Nov. 21, 2019

(65) Prior Publication Data
US 2021/0234161 A1    Jul. 29, 2021

(30) Foreign Application Priority Data

May 15, 2018    (KR) ................ 10-2018-0055515

(51) Int. Cl.
*H01M 4/38* (2006.01)
*H01M 4/04* (2006.01)
(Continued)

(52) U.S. Cl.
CPC ......... *H01M 4/386* (2013.01); *H01M 4/0404* (2013.01); *H01M 4/48* (2013.01);
(Continued)

(58) Field of Classification Search
CPC ...... H01M 4/386; H01M 4/0404; H01M 4/48; H01M 4/58; H01M 10/0525; H01M 2004/027; H01M 2004/028
(Continued)

(56) References Cited

U.S. PATENT DOCUMENTS

2006/0093873 A1   5/2006   Howard et al.
2006/0093894 A1   5/2006   Scott et al.
(Continued)

FOREIGN PATENT DOCUMENTS

CN   102113154 A   6/2011
CN   102790205 A   11/2012
(Continued)

OTHER PUBLICATIONS

Cetinkaya et al., "Improvement cycieability of core-shell silicon/copper compsite electrodes for Li-ion batteries by using electroless deposition of copper on silicon powders", Power Technology, vol. 253, 2014 (Abailable online Nov. 14, 2013), pp. 63-69.
(Continued)

*Primary Examiner* — James M Erwin
(74) *Attorney, Agent, or Firm* — Birch, Stewart, Kolasch & Birch, LLP

(57) ABSTRACT

A negative electrode active material including a core including silicon, and a coating layer disposed on at least a portion of a surface of the core and including a coating material, wherein the coating material includes at least one selected from the group consisting of $Li_aV_bO_2$ and $MgH_2$, wherein $0.5<a<1.5$ and $0.5<b<1.5$ is provided. Also, a negative electrode including the negative electrode active material
(Continued)

and a lithium secondary battery including the negative electrode, are provided.

7 Claims, 4 Drawing Sheets

(51) Int. Cl.
*H01M 4/48* (2010.01)
*H01M 4/58* (2010.01)
*H01M 10/0525* (2010.01)
*H01M 4/02* (2006.01)

(52) U.S. Cl.
CPC ......... *H01M 4/58* (2013.01); *H01M 10/0525* (2013.01); *H01M 2004/027* (2013.01); *H01M 2004/028* (2013.01)

(58) Field of Classification Search
USPC .................................................... 429/231.95
See application file for complete search history.

(56) References Cited

U.S. PATENT DOCUMENTS

| | | |
|---|---|---|
| 2006/0093913 A1 | 5/2006 | Howard et al. |
| 2006/0093921 A1 | 5/2006 | Scott et al. |
| 2006/0095094 A1 | 5/2006 | Howard et al. |
| 2008/0020278 A1 | 1/2008 | Schmidt et al. |
| 2008/0020279 A1 | 1/2008 | Schmidt et al. |
| 2008/0044728 A1 | 2/2008 | Schmidt et al. |
| 2009/0035662 A1 | 2/2009 | Scott et al. |
| 2009/0274849 A1 | 11/2009 | Scott et al. |
| 2009/0286151 A1 | 11/2009 | Scott et al. |
| 2010/0316898 A1 | 12/2010 | Howard et al. |
| 2011/0171502 A1 | 7/2011 | Kottenstette et al. |
| 2011/0281148 A1 | 11/2011 | Scott et al. |
| 2012/0105008 A1 | 5/2012 | Lipcsei et al. |
| 2013/0011736 A1* | 1/2013 | Loveness ............... H01M 4/366 977/734 |
| 2013/0164584 A1 | 6/2013 | Scott et al. |
| 2014/0057176 A1 | 2/2014 | Park et al. |
| 2015/0171420 A1 | 6/2015 | Park et al. |
| 2015/0263392 A1 | 9/2015 | Scott et al. |
| 2016/0164078 A1* | 6/2016 | Hong .................... H01M 4/622 429/217 |
| 2016/0172669 A1 | 6/2016 | Young et al. |
| 2016/0172676 A1 | 6/2016 | Young et al. |
| 2017/0005329 A1 | 1/2017 | Kim et al. |
| 2017/0005361 A1 | 1/2017 | Kamezaki et al. |
| 2017/0082948 A1 | 3/2017 | Ohgoshi et al. |
| 2017/0092939 A1 | 3/2017 | Kim et al. |
| 2018/0175462 A1 | 6/2018 | Scott et al. |
| 2018/0183066 A1* | 6/2018 | Zhamu ................ H01M 50/46 |
| 2018/0219216 A1 | 8/2018 | Choi et al. |
| 2018/0226641 A1 | 8/2018 | Yang et al. |
| 2019/0260022 A1 | 8/2019 | Mattis et al. |

FOREIGN PATENT DOCUMENTS

| | | |
|---|---|---|
| CN | 102891306 A | 1/2013 |
| CN | 106410161 A | 2/2017 |
| CN | 106558683 A | 4/2017 |
| CN | 106946259 A | 7/2017 |
| CN | 106953069 A | 7/2017 |
| CN | 106972151 A | 7/2017 |
| CN | 107851777 A | 3/2018 |
| CN | 107851780 A | 3/2018 |
| JP | 2012-33317 A | 2/2012 |
| JP | 2013-37951 A | 2/2013 |
| JP | 2013-131366 A | 7/2013 |
| KR | 10-2008-0107997 A | 12/2008 |
| KR | 10-2011-0035430 A | 4/2011 |
| KR | 10-2012-0123380 A | 11/2012 |
| KR | 10-2015-0068769 A | 6/2015 |
| KR | 10-2015-0071521 A | 6/2015 |
| KR | 10-2016-0085913 A | 7/2016 |
| KR | 10-2017-0004673 A | 1/2017 |
| KR | 10-2017-0093142 A | 8/2017 |

OTHER PUBLICATIONS

Extended European Search Report dated May 3, 2021 for Application No. 19803852.3.
Lee et al., "Electrochemical Properties of the Carbon-Coated Lithium Vanadium Oxide Anode for Lithium-Ion Batteries", Journal of Alloys and Compounds, col. 509, 2011, pp. 3136-3140.
Qi et al., "Luminescent Principte and Luminescent Materials", University og Electronic Science and Technology of Chinese Press, Feb. 2012, pp. 192-195 (7 pages total), with an English translation.
Zhang et al., "Magnesium Hydride Nanoparticels Self-Assembled on Graphene as Anode Material for High-Performance Lithium-Ion Batteries", ACS Nano, vol. 12, 2018, 3816-3824.
International Search Report (PCT/ISA/210) issued in PCT/KR2019/005579 dated Aug. 16, 2019.

* cited by examiner

NEGATIVE ELECTRODE ACTIVE MATERIAL, NEGATIVE ELECTRODE INCLUDING NEGATIVE ELECTRODE ACTIVE MATERIAL, AND LITHIUM SECONDARY BATTERY INCLUDING NEGATIVE ELECTRODE

TECHNICAL FIELD

Cross-Reference to Related Applications

This application claims the benefit of Korean Patent Application No. 10-2018-0055515, filed on May 15, 2018, in the Korean Intellectual Property Office, the disclosure of which is incorporated herein in its entirety by reference.

TECHNICAL FIELD

The present invention relates to a negative electrode active material, a negative electrode including the negative electrode active material, and a lithium secondary battery including the negative electrode, wherein the negative electrode active material includes a core including silicon, and a coating layer disposed on the core and including a coating material, and the coating material includes at least one selected from the group consisting of $Li_aV_bO_2$ and $MgH_2$, and the range of a and the range of b in the $Li_aV_bO_2$ are $0.5<a<1.5$ and $0.5<b<1.5$, respectively.

BACKGROUND ART

Demands for the use of alternative energy or clean energy are increasing due to the rapid increase in the use of fossil fuel, and as a part of this trend, the most actively studied field is a field of electricity generation and electricity storage using an electrochemical reaction.

Currently, a typical example of an electrochemical device using such electrochemical energy is a secondary battery and the usage areas thereof are increasing more and more. In recent years, as technology development of and demand for portable devices such as portable computers, mobile phones, and cameras have increased, demands for secondary batteries as an energy source have been significantly increased. Among such secondary batteries, lithium secondary batteries having high energy density, that is lithium secondary batteries having high capacity, have been subjected to considerable research and also have been commercialized and widely used.

In general, a secondary battery is composed of a positive electrode, a negative electrode, an electrolyte, and a separator. Among the above, the negative electrode includes a negative electrode current collector and a negative electrode active material, and may include a negative electrode active material layer disposed on the negative electrode current collector.

Meanwhile, in order to increase the energy density of the negative electrode, various negative electrode active materials such as silicon is used. However, silicon expands excessively in volume during charge and discharge, thereby causing electrical short circuits between negative electrode active materials, and the structure of the negative electrode active material itself is destroyed. Furthermore, in the case in which the negative electrode discharge potential in the secondary battery becomes higher than a predetermined level, the structure of the silicon in the negative electrode in which lithium is intercalated is changed into a structure (phase separation) in which two separated phases of $Li_{12}Si_7$ and Si exist. Accordingly, due to the difference in volume expansion of the two phases during charge and discharge, excessive stress is generated at the interface of the two phases. Accordingly, the pulverization of the negative electrode active material occurs, which leads to the deterioration in the lifespan of the battery.

In order to solve the above problem, a method of avoiding the problem by using only the capacity at a discharge potential of less than a predetermined level without using all of the discharge capacity of the negative electrode including silicon is used. However, the deterioration in battery capacity is caused by using only some capacity.

DISCLOSURE OF THE INVENTION

Technical Problem

An aspect of the present invention is to control the phase separation in a negative electrode active material to improve battery lifespan properties, and at the same time, widen the available discharge capacity section to improve battery capacity.

Technical Solution

According to an aspect of the present invention, there is provided a negative electrode active material including a core including silicon, and a coating layer disposed on the core and including a coating material, wherein the coating material includes at least one selected from the group consisting of $Li_aV_bO_2$ and $MgH_2$, and the range of a and the range of b in $Li_aV_bO_2$ are $0.5<a<1.5$ and $0.5<b<1.5$, respectively.

According to another aspect of the present invention, there is provided a negative electrode including a negative electrode current collector and a negative electrode active material layer disposed on the negative electrode current collector, wherein the negative electrode active material layer includes the negative electrode active material.

According to yet another aspect of the present invention, there is provided a secondary battery including the negative electrode, a positive electrode, and a separator interposed between the positive electrode and the negative electrode, and an electrolyte.

Advantageous Effects

From the moment discharge begins, the lithium content in silicon is reduced, and since the flat section of the silicon has a lower negative electrode discharge potential than the flat section of a coating material, the silicon containing lithium is mainly involved in an initial discharge reaction. Thereafter, when the discharge potential gradually increases and reaches near 0.5 V at which the flat section of the coating material is present, the coating material is mainly involved in a discharge reaction and the silicon containing lithium is relatively less involved in the reaction, so that the phase separation of the silicon containing lithium may be suppressed. Accordingly, the pulverization of the silicon is suppressed, thereby preventing electrical short circuits, so that the lifespan properties of a battery may be improved. Furthermore, due to the above characteristics, it is not necessary to limit the discharge section of the silicon, and when the discharge continues after the section in which the silicon is mainly involved in the reaction, the discharge by the coating material may proceed. Therefore, the capacity of the battery may be improved.

BEST MODE FOR CARRYING OUT THE INVENTION

Figure 1:
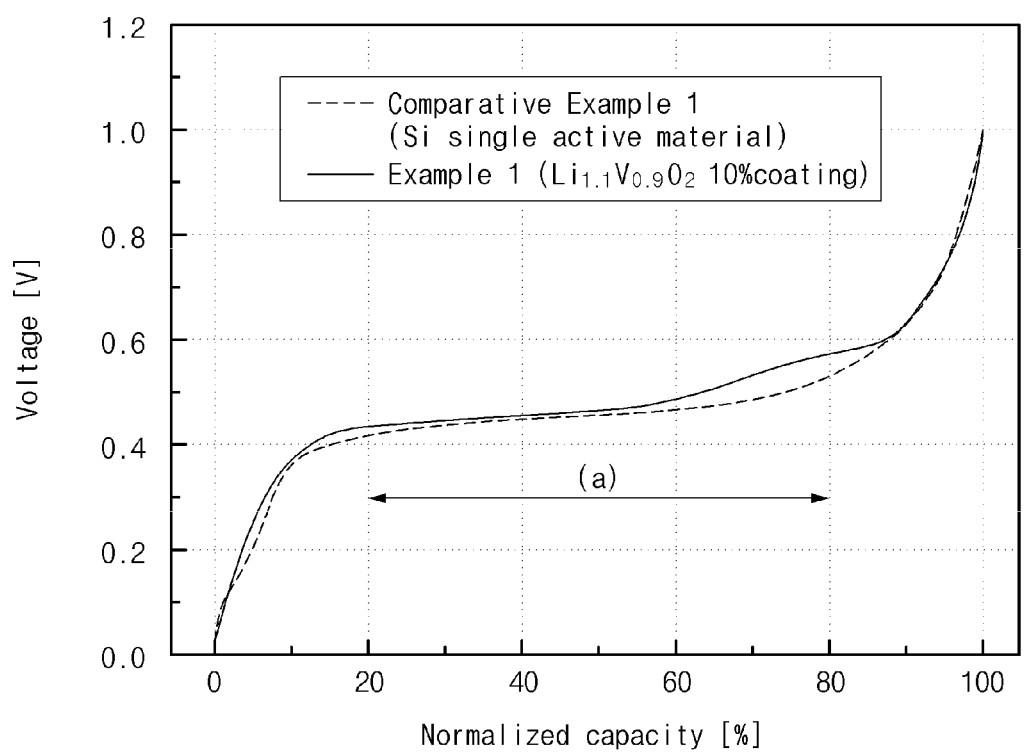
FIG. 1 is a discharge curve of the negative electrode of each of Example 1 and Comparative Example 1.

Hereinafter, the present invention will be described in more detail to facilitate understanding of the present invention.

It will be understood that words or terms used in the specification and claims shall not be interpreted as having the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

The terminology used herein is for the purpose of describing particular exemplary embodiments only and is not intended to be limiting of the present invention. The terms of a singular form may include plural forms unless the context clearly indicates otherwise.

In the present specification, it will be further understood that the terms "include," "comprise," or "have" when used in this specification, specify the presence of stated features, numbers, steps, elements, or combinations thereof, but do not preclude the presence or addition of one or more other features, numbers, steps, elements, or combinations thereof.

In the present specification, an average particle diameter ($D_{50}$) may be defined as a particle diameter corresponding to 50% of the volume accumulation in a particle diameter distribution curve of a particle. The average particle diameter ($D_{50}$) may be measured by, for example, a laser diffraction method. The laser diffraction method generally enables measurement of a particle diameter from a submicron region to several millimeters, so that results of high reproducibility and high resolution may be obtained.

<Negative Electrode Active Material>

A negative electrode active material according to an embodiment of the present invention includes a core including silicon, and a coating layer disposed on at least a portion of a surface of the core and including a coating material, wherein the coating material includes at least one selected from the group consisting of $Li_aV_bO_2$ and $MgH_2$, wherein $0.5<a<1.5$ and $0.5<b<1.5$.

The core may include silicon, and specifically, the core may be silicon. The silicon has a high energy density, and thus, may improve the capacity of a battery when included in the negative electrode active material. The silicon may be at least one selected from the group consisting of crystalline silicon, amorphous silicon, and silicon in which crystalline silicon and amorphous silicon are mixed.

An average particle diameter ($D_{50}$) of the core may be 0.05 μm to 100 μm, specifically 0.1 μm to 10 μm. When the above average particle diameter range is satisfied, side reactions with an electrolyte are suppressed and the oxidation of the core is controlled to prevent initial efficiency deterioration, and it is advantageous on an electrode manufacturing process.

The coating layer may be disposed on the core, and specifically, may cover at least a portion of the core.

The coating layer may include a coating material, and specifically, may be composed of the coating material.

The coating material includes at least one selected from the group consisting of $Li_aV_bO_2$ and $MgH_2$, wherein $0.5<a<1.5$ and $0.5<b<1.5$.

Figure 2:
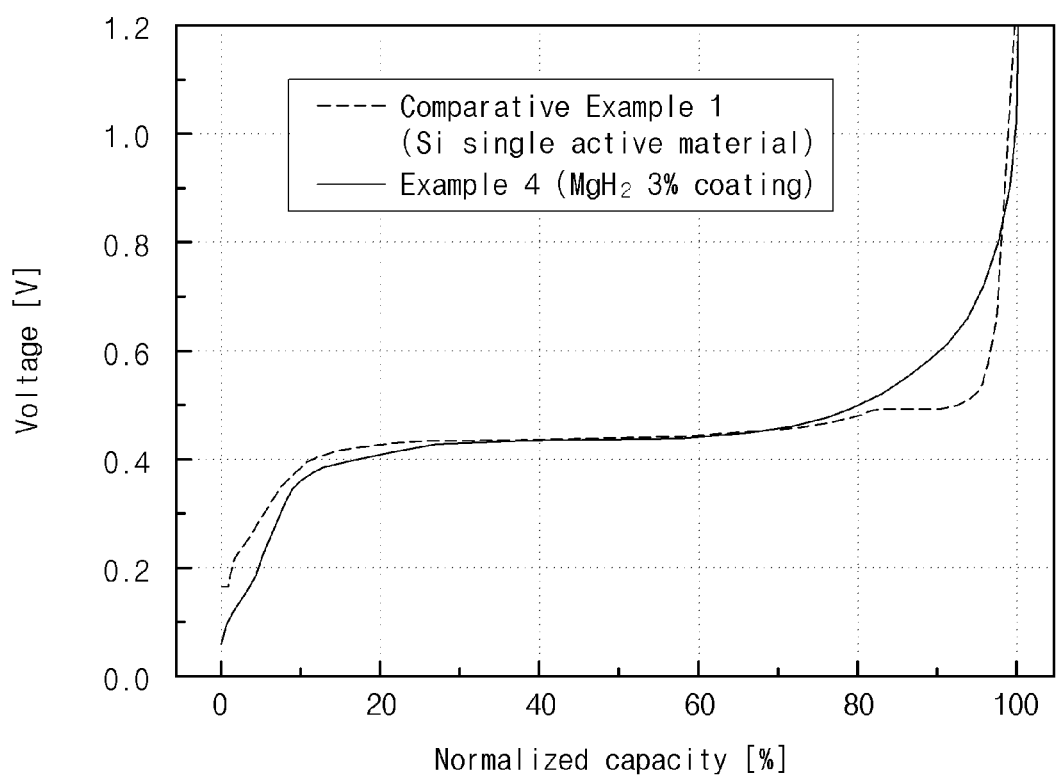
FIG. 2 is a discharge curve of the negative electrode of each of Example 4 and Comparative Example 1.

Referring to Comparative Example 1 (silicon without a coating layer formed on the surface thereof) of FIG. 1 and FIG. 2, in the discharge potential graph according to the discharge rate, the discharge curve of the silicon has a section ((a) in FIG. 1. Hereinafter, a flat section) in which the slope is almost unchanged between the discharge potentials of 0.4 V and 0.5 V. In the flat section when discharge proceeds, the content of lithium in a compound of silicon and lithium formed during charge is gradually reduced. Thereafter, when the negative electrode discharge potential becomes higher than a predetermined level, silicon containing lithium is changed into a structure (phase separation) separated into two phases of $Li_{12}Si_7$ and Si. Particularly, in the case of silicon, when the negative electrode discharge potential becomes higher than a predetermined potential, for example, 0.5 V or higher, the phase separation occurs. Accordingly, due to the difference in volume expansion of the two phases, excessive stress is generated at the interface of the two phases. Accordingly, the pulverization of the silicon occurs, which leads to the deterioration in the lifespan of a battery.

The coating layer including the coating material may solve the above problem. Specifically, the discharge curve of the coating material has a flat section at a discharge potential higher than the discharge potential at which the flat section of the silicon is present. In addition, even after the flat section of the silicon ends and even after the time when the discharge potential sharply increases by the phase separation of the silicon, the flat section of the discharge curve of the coating material is maintained to some extent. In other words, the discharge should proceed further than the end point of the flat section of the silicon (the point where the discharge potential of silicon increases sharply, such as around 0.5V) to end the flat section of the coating material, and the flat section of the coating material is present in a discharge potential range higher than the flat section of the silicon. Specifically, the flat section of the coating material is near 0.5 V.

When the coating layer includes the coating material, following effects are obtained. From the moment discharge begins, the lithium content in silicon is reduced, and since the flat section of the silicon has a lower negative electrode discharge potential than the flat section of a coating material, the silicon containing lithium is mainly involved in an initial discharge reaction. Thereafter, when the discharge potential gradually increases and reaches near 0.5 V at which the flat section of the coating material is present, the coating material is mainly involved in a discharge reaction and the silicon containing lithium is relatively less involved in the reaction, so that the phase separation of the silicon containing lithium may be suppressed. Accordingly, the pulverization of the silicon is suppressed, thereby preventing electrical short circuits, so that the lifespan properties of a battery may be improved. Furthermore, due to the above characteristics, it is not necessary to limit the discharge section of the silicon, and when the discharge continues after the section in which the silicon is mainly involved in the reaction, the discharge by the coating material may proceed. Therefore, the capacity of the battery may be improved.

Preferably, the coating material may be the $MgH_2$. The $MgH_2$ has a flat section at a discharge potential higher than the discharge potential at which the flat section of the silicon is located, and at the same time, has a relatively low flat section compared to other coating materials. Particularly, the discharge potential at which the flat section of $MgH_2$ is located is near the discharge potential at which the phase separation of the silicon occurs, and thus, it is possible to further suppress the phase separation of the silicon. In addition, the flat section of the $MgH_2$ ends at a higher discharge rate compared to other coating materials, the time at which the discharge potential of a negative electrode increases so that the phase separation of the silicon may occur may be relatively late.

A thickness of the coating layer may be 0.5 nm to 10 μm, specifically 1 nm to 5 μm, and more specifically 1 nm to 1 μm. When the above range is satisfied, the phase separation of the silicon may be effectively suppressed.

When the coating material includes $Li_aV_bO_2$, the $Li_a$-$V_bO_2$ may be present in the negative electrode active material in an amount of 1 wt % to 50 wt %, specifically 1 wt % to 30 wt %, and more specifically 5 wt % to 20 wt %. When the above range is satisfied, the phase separation of the silicon may be effectively controlled, so that the lifespan properties of the battery may be further improved. In addition, when the preferred range of 5 wt % to 20 wt % is satisfied, the reduction in the discharge capacity (mAh/g) per weight of a negative electrode may be suppressed to the maximum, so that the suppression of the phase separation of the silicon and the improvement of the capacity of the negative electrode may be simultaneously achieved.

When the coating material includes $MgH_2$, the $MgH_2$ may be present in the negative electrode active material in an amount of 1 wt % to 80 wt %, specifically 1 wt % to 50 wt %, and may be included in an amount of preferably 2 wt % to 50 wt %, and more preferably 2 wt % to 4.5 wt %. When the above range is satisfied, the phase separation of the silicon may be effectively controlled, so that the lifespan properties of the battery may be further improved. In addition, when the preferred range of 2 wt % to 4.5 wt % is satisfied, the reduction in the discharge capacity (mAh/g) per weight of the negative electrode may be suppressed to the maximum, so that the suppression of the phase separation of the silicon and the improvement of the capacity of the negative electrode may be simultaneously achieved.

The content of the coating material may be confirmed by X-ray Photoelectron Spectroscopy (XPS) analysis, and the like.

<Negative Electrode>

A negative electrode according to yet another embodiment of the present invention may include a negative electrode active material. In this case, the negative electrode active material may be the same as the negative electrode active materials of the embodiments described above. Specifically, the negative electrode may include a negative electrode current collector and a negative electrode active material layer disposed on the negative electrode current collector. The negative electrode active material layer may include the negative electrode active material. Furthermore, the negative electrode active material layer may include a binder and/or a conductive material.

The negative electrode current collector is not particularly limited as long as it has conductivity without causing a chemical change in the battery. For example, as the negative electrode current collector, copper, stainless steel, aluminum, nickel, titanium, fired carbon, or aluminum or stainless steel that is surface-treated with one of carbon, nickel, titanium, silver, and the like may be used. Specifically, a transition metal which well adsorbs carbon such as copper and nickel well may be used as the negative electrode current collector. The thickness of the negative electrode current collector may be from 6 μm to 20 μm, but the thickness of the negative electrode current collector is not limited thereto.

The binder may include at least any one selected from the group consisting of a polyvinylidene fluoride-hexafluoropropylene copolymer (PVDF-co-HFP), polyvinylidenefluoride, polyacrylonitrile, polymethylmethacrylate, polyvinyl alcohol, carboxymethyl cellulose (CMC), starch, hydroxypropyl cellulose, regenerated cellulose, polyvinylpyrrolidone, tetrafluoroethylene, polyethylene, polypropylene, polyacrylic acid, an ethylene-propylene-diene monomer (EPDM), a sulfonated EPDM, styrene-butadiene rubber (SBR), fluorine rubber, poly acrylic acid, materials having the hydrogen thereof substituted with Li, Na, or Ca, and the like, and a combination thereof. In addition, the binder may include various copolymers thereof.

The conductive material is not particularly limited as long as it has conductivity without causing a chemical change in the battery. For example, graphite such as natural graphite or artificial graphite; a carbon-based material such as carbon black, acetylene black, Ketjen black, channel black, furnace black, lamp black, and thermal black; conductive fiber such as carbon fiber and metal fiber; a conductive tube such as a carbon nanotube; metal powder such as fluorocarbon powder, aluminum powder, and nickel powder; a conductive whisker such as zinc oxide and potassium titanate; a conductive metal oxide such as titanium oxide; a conductive material such as a polyphenylene derivative, and the like may be used.

<Secondary Battery>

A secondary battery according to yet another embodiment of the present invention may include a negative electrode, a positive electrode, a separator interposed between the positive electrode and the negative electrode, and an electrolyte. The negative electrode is the same as the negative electrode described above. Since the negative electrode has been described above, the detailed description thereof will be omitted.

The positive electrode may include a positive electrode current collector, and a positive electrode active material layer formed on the positive electrode current collector and including the positive electrode active material.

In the positive electrode, the positive electrode current collector is not particularly limited as long as it has conductivity without causing a chemical change in the battery. For example, stainless steel, aluminum, nickel, titanium, fired carbon, or aluminum or stainless steel that is surface-treated with one of carbon, nickel, titanium, silver, and the like may be used. Also, the positive electrode current collector may typically have a thickness of 3 μm to 500 μm, and microscopic irregularities may be prepared on the surface of the positive electrode current collector to improve the adhesion of the positive electrode active material. For example, the positive electrode current collector may be used in various forms such as a film, a sheet, a foil, a net, a porous body, a foam, a non-woven body, and the like.

The positive electrode active material may be a positive electrode active material commonly used in the art. Specifically, the positive electrode active material may be a layered compound such as a lithium cobalt oxide ($LiCoO_2$) and a lithium nickel oxide ($LiNiO_2$), or a compound substituted with one or more transition metals; a lithium iron oxide such as $LiFe_3O_4$; a lithium manganese oxide such as $Li_{1+c1}Mn_{2-c1}O_4$ ($0 \leq c1 \leq 0.33$), $LiMnO_3$, $LiMn_2O_3$, and $LiMnO_2$; lithium copper oxide ($Li_2CuO_2$); a vanadium oxide such as $LiV_3O_8$, $V_2O_5$, and $Cu_2V_2O_7$; a Ni-site type lithium nickel oxide represented by the formula $LiNi_{1-c2}M_{c2}O_2$ (wherein M is any one of Co, Mn, Al, Cu, Fe, Mg, B or Ga, and $0.01 \leq c2 \leq 0.3$); a lithium manganese composite oxide represented by the formula $LiMn_{2-c3}M_{c3}O_2$ (wherein, M is any one of Co, Ni, Fe, Cr, Zn, or Ta, and $0.01 \leq c3 \leq 0.1$), or by the formula $Li_2Mn_3MO_8$ (wherein, M is any one of Fe, Co, Ni, Cu, or Zn); $LiMn_2O_4$ having a part of Li in the formula substituted with an alkaline earth metal ion, and the like, but is not limited thereto. The positive electrode may be a Li-metal.

The positive electrode active material layer may include a positive electrode conductive material and a positive electrode binder, together with the positive electrode active material described above.

At this time, the positive electrode conductive material is used to impart conductivity to an electrode, and any positive electrode conductive material may be used without particular limitation as long as it has electronic conductivity without causing a chemical change in a battery to be constituted. Specific examples thereof may include graphite such as natural graphite or artificial graphite; a carbon-based material such as carbon black, acetylene black, Ketjen black, channel black, furnace black, lamp black, thermal black, and carbon fiber; metal powder or metal fiber of such as copper, nickel, aluminum, and silver; a conductive whisker such as a zinc oxide whisker and a potassium titanate whisker; a conductive metal oxide such as titanium oxide; or a conductive polymer such as a polyphenylene derivative, and any one thereof or a mixture of two or more thereof may be used.

In addition, the positive electrode binder serves to improve the bonding between positive electrode active material particles and the adhesion between the positive electrode active material and the positive electrode current collector. Specific examples thereof may include polyvinylidene fluoride (PVDF), a polyvinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene monomer (EPDM), a sulfonated EPDM, styrene-butadiene rubber (SBR), fluorine rubber, or various copolymers thereof, and any one thereof or a mixture of two or more thereof may be used.

The separator is to separate the negative electrode and the positive electrode and to provide a movement path for lithium ions. Any separator may be used without particular limitation as long as it is a separator commonly used in a secondary battery. Particularly, a separator having excellent moisture-retention of an electrolyte as well as low resistance to ion movement in the electrolyte is preferable. Specifically, a porous polymer film, for example, a porous polymer film manufactured using a polyolefin-based polymer such as an ethylene homopolymer, a propylene homopolymer, an ethylene/butene copolymer, an ethylene/hexene copolymer, and an ethylene/methacrylate copolymer, or a laminated structure having two or more layers thereof may be used. Also, a typical porous non-woven fabric, for example, a non-woven fabric formed of glass fiber having a high melting point, or polyethylene terephthalate fiber, and the like may be used as the separator. Furthermore, a coated separator including a ceramic component or a polymer material may be used to secure heat resistance or mechanical strength, and may be used in a single-layered or a multi-layered structure, selectively.

The electrolyte may be an organic liquid electrolyte, an inorganic liquid electrolyte, a solid polymer electrolyte, a gel-type polymer electrolyte, a solid inorganic electrolyte, a molten-type inorganic electrolyte, and the like, which may be used in the preparation of a lithium secondary battery, but is not limited thereto.

Specifically, the electrolyte may include a non-aqueous organic solvent and a lithium salt.

As the non-aqueous organic solvent, for example, an aprotic organic solvent, such as N-methyl-2-pyrrolidone, propylene carbonate, ethylene carbonate, butylene carbonate, dimethyl carbonate, diethyl carbonate, y-butyrolactone, 1,2-dimethoxy ethane, tetrahydrofuran, 2-methyl tetrahydrofuran, dimethyl sulfoxide, 1,3-dioxolane, formamide, diemethylformamide, dioxolane, acetonitrile, nitromethane, methyl formate, methyl acetate, phosphate triester, trimethoxy methane, a dioxolane derivative, sulfolane, methyl sulfolane, 1,3-dimethyl-2-imidazolidinone, a propylene carbonate derivative, a tetrahydrofuran derivative, ether, methyl propionate, and ethyl propionate may be used.

In particular, among the carbonate-based organic solvents, ethylene carbonate and propylene carbonate which are cyclic carbonates may be preferably used since they are organic solvents of a high viscosity having high permittivity to dissociate a lithium salt well. Furthermore, when the cyclic carbonate is mixed with a linear carbonate of a low viscosity and low permittivity such as dimethyl carbonate and diethyl carbonate in an appropriate ratio, it is able to prepare an electrolyte having a high electric conductivity, therefore such a combined use is more preferably.

As the metal salt, a lithium salt may be used. The lithium salt is a material which is easily dissolved in the non-aqueous electrolyte. For example, as an anion of the lithium salt, one or more selected from the group consisting of $F^-$, $Cl^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$ may be used.

In the electrolyte, in order to improve the lifespan characteristics of a battery, to suppress the decrease in battery capacity, and to improve the discharge capacity of the battery, one or more additives, for example, a halo-alkylene carbonate-based compound such as difluoroethylene carbonate, pyridine, triethylphosphite, triethanolamine, cyclic ether, ethylenediamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, or aluminum trichloride, and the like may be further included other than the above electrolyte components.

According to yet another embodiment of the present invention, a battery module including the secondary battery as a unit cell, and a battery pack including the same are provided. The battery module and the battery pack include the secondary battery which has high capacity, high rate properties, and cycle properties, and thus, may be used as a power source of a medium-and-large sized device selected from the group consisting of an electric car, a hybrid electric vehicle, a plug-in hybrid electric vehicle, and a power storage system.

Hereinafter, preferred embodiments of the present invention will be described in detail to facilitate understanding of the present invention. However, the embodiments are merely illustrative of the present invention, and thus, it will be apparent to those skilled in the art that various modifications and variations can be made without departing from the scope and spirit of the present invention as disclosed in the accompanying claims. It is obvious that such variations and modifications fall within the scope of the appended claims.

EXAMPLES AND COMPARATIVE EXAMPLE

Example 1: Manufacturing of Negative Electrode (1) Preparation of Negative Electrode Active Material Silicon having an average particle diameter ($D_{50}$) of 5 μm was prepared and used as a core. 9 g of the core was mixed with 1 g of $Li_{1.1}V_{0.9}O_2$. Thereafter, the mixture was dried at 150° C. for 48 hours in a drying furnace. Through the above, a negative electrode active material of Example 1 including the core and a coating layer disposed on the core was prepared.

(2) Manufacturing of Negative Electrode

The prepared negative electrode active material, carbon black which is a conductive material, carboxylmethyl cellulose (CMC) and styrene butadiene rubber (SBR) which are binders were mixed at a weight ratio of 70:10:10:10 to prepare 5 g of a mixture. The mixture was added with distilled water to prepare a negative electrode slurry (The solid content of the slurry was 40 wt %). The negative electrode slurry was applied on a copper (Cu) metal thin film having a thickness of 20 μm, which is a negative electrode current collector, and then dried. At this time, the temperature of circulated air was 70° C. Thereafter, the copper (Cu) metal thin film applied with the negative electrode slurry and then dried was roll-pressed, and then dried in a vacuum oven at 130° C. for 12 hours, and then punched into a circular shape of 1.4875 cm² to manufacture a negative electrode.

Example 2: Manufacturing of Negative Electrode

A negative electrode of Example 2 was manufactured in the same manner as in Example 1 except that 3 g of $Li_{1.1}V_{0.9}O_2$ was mixed when preparing the negative electrode active material of Example 1.

Example 3: Manufacturing of Negative Electrode

A negative electrode of Example 3 was manufactured in the same manner as in Example 1 except that 0.2 g of $Li_{1.1}V_{0.9}O_2$ was mixed when preparing the negative electrode active material of Example 1.

Example 4: Manufacturing of Negative Electrode (1) Preparation of Negative Electrode Active Material Silicon having an average particle diameter ($D_{50}$) of 5 μm was prepared and used as a core. 9.7 g of the core was mixed with 0.3 g of $MgH_2$. Thereafter, the mixture was dried at 150° C. for 2 hours in a drying furnace. Through the above, a negative electrode active material of Example 4 including the core and a coating layer disposed on the core was prepared.

(2) Manufacturing of Negative Electrode

The prepared negative electrode active material, carbon black which is a conductive material, carboxylmethyl cellulose (CMC) which is a binder, and styrene butadiene rubber (SBR) were mixed a weight ratio of 70:10:10:10 to prepare 5 g of a mixture. The mixture was added with distilled water to prepare a negative electrode slurry (The solid content of the slurry was 40 wt %). The negative electrode slurry was applied on a copper (Cu) metal thin film having a thickness of 20 μm, which is a negative electrode current collector, and then dried. At this time, the temperature of circulated air was 70° C. Thereafter, the copper (Cu) metal thin film applied with the negative electrode slurry and then dried was roll-pressed, and then dried in a vacuum oven at 130° C. for 12 hours, and then punched into a circular shape of 1.4875 cm² to manufacture a negative electrode.

Example 5: Manufacturing of Negative Electrode

A negative electrode of Example 5 was manufactured in the same manner as in Example 1 except that 0.1 g of $MgH_2$ was mixed when preparing the negative electrode active material of Example 1.

Example 6: Manufacturing of Negative Electrode

A negative electrode of Example 6 was manufactured in the same manner as in Example 1 except that 0.5 g of $MgH_2$ was mixed when preparing the negative electrode active material of Example 1.

Comparative Example 1: Manufacturing of Negative Electrode

A negative electrode of Comparative Example 1 was manufactured in the same manner as in Example 1 except that silicon having an average particle diameter ($D_{50}$) of 5 μm was used instead of the negative electrode active material of Example 1.

TABLE 1

|  | Coating material | Content of coating material in negative electrode active material (parts by weight) |
| --- | --- | --- |
| Example 1 | $Li_{1.1}V_{0.9}O_2$ | 10 |
| Example 2 | $Li_{1.1}V_{0.9}O_2$ | 25 |
| Example 3 | $Li_{1.1}V_{0.9}O_2$ | 2.17 |
| Example 4 | $MgH_2$ | 3 |
| Example 5 | $MgH_2$ | 1.02 |
| Example 6 | $MgH_2$ | 4.90 |
| Comparative Example 1 | No coating layer | No coating layer |

Experimental Example 1: Identification of Negative Electrode Discharge Curve

The discharge curve of each of Examples 1 and 4 and Comparative Example 1 was evaluated as follows, and is shown in FIG. 1 and FIG. 2.

Specifically, with respect to the negative electrode of each of Examples 1 and 4 and Comparative Example 1, a lithium (Li) metal thin film cut into a circular shape of 1.7671 cm$^2$ was prepared as a positive electrode. A porous polyethylene separator was interposed between the positive electrode and the negative electrode, and then vinylene carbonate dissolved in 1.5 wt % and fluoroethylene carbonate dissolved in 2.0 wt % were dissolved in a mixed solution in which methyl ethyl carbonate (EMC) and ethylene carbonate (EC) are mixed at a mixing volume ratio of 7:3. Thereafter, an electrolyte in which LiPF$_6$ of 1.0 M concentration is dissolved was injected thereto to manufacture a lithium coin half-cell.

Charging was performed at 0.1 C current rate until the potential difference between the negative electrode and the lithium metal thin film in the manufactured half-cell reached 0.005 V, and then charging was performed with 0.005 V until the current rate reached 0.005 C. Thereafter, discharging was performed at 0.1 C current rate until the difference reached 1.2 V to derive the negative electrode discharge curve of each of FIG. 1 and FIG. 2.

Referring to FIG. 1 and FIG. 2, unlike the silicon in Comparative Example 1 which includes no coating layer, the negative electrode active material of Example 1 which includes the coating layer of the present invention has two flat sections present in discharge ranges different from each other, and particularly, the second flat section appears during the discharging appears near 0.5 V. Accordingly, in the first flat section, silicon is mainly involved in discharging, and in the second flat section, the coating material of the coating layer is mainly involved in discharging, so that the phase separation of the silicon may be suppressed even at a high discharge potential.

Experimental Example 2: Evaluation of Cycle Properties of Secondary Battery

Figure 3:
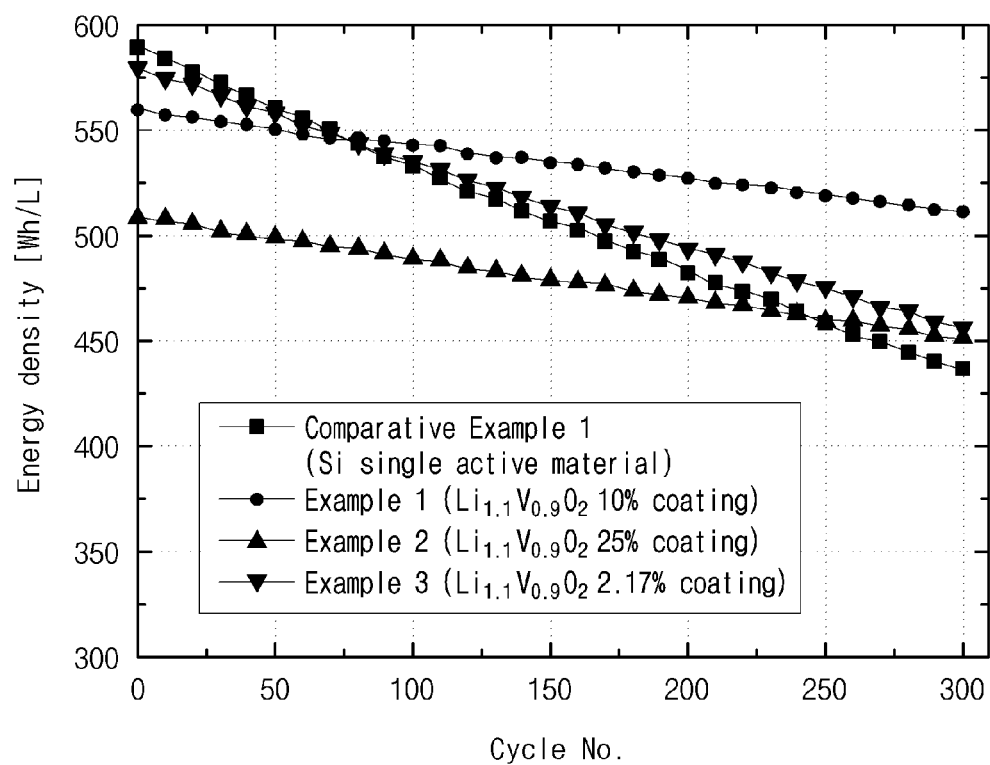
FIG. 3 is a graph showing the capacity per cycle of a secondary battery manufactured using the negative electrode of each of Examples 1 to 3 and Comparative Example 1.
Figure 4:
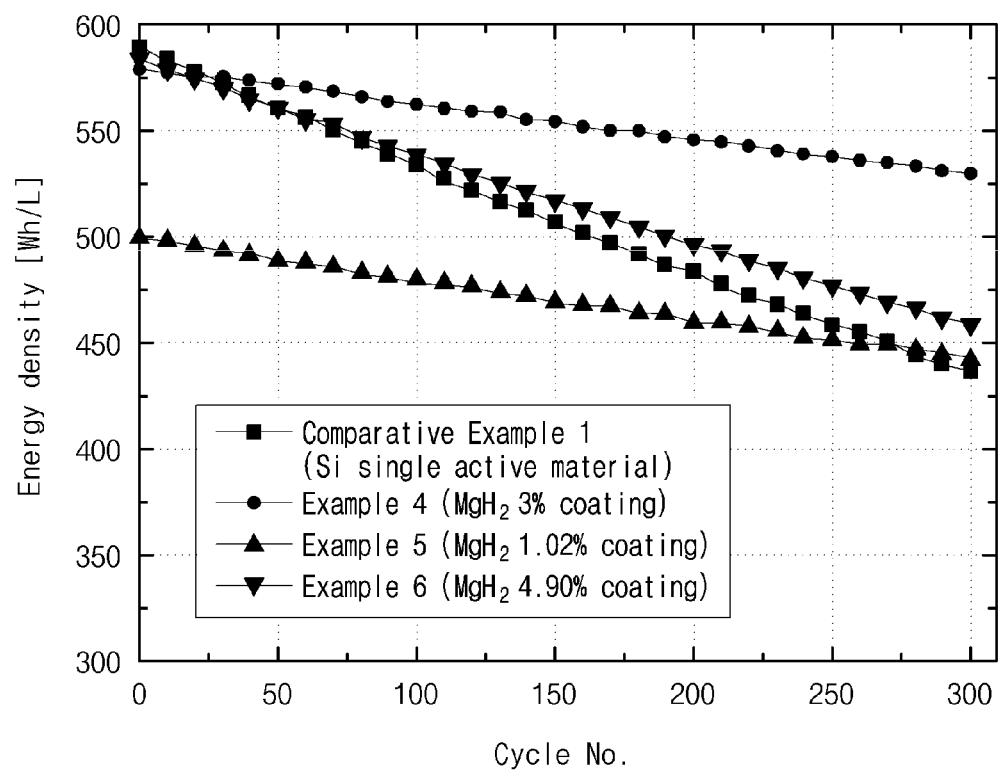
FIG. 4 is a graph showing the capacity per cycle of a secondary battery manufactured using the negative electrode of each of Examples 4 to 6 and Comparative Example 1.

The cycle properties of a secondary battery using the negative electrode of each of Examples 1 to 6 and Comparative Example 1 were evaluated as follows, and are shown in FIG. 3 and FIG. 4.

As the positive electrode active material, Li[Ni$_{0.6}$Mn$_{0.2}$Co$_{0.2}$]O$_2$ was used. The positive electrode active material, carbon black which is a conductive material, polyvinylidene fluoride (PVDF) which is a binder were mixed at a weight ratio of 94:4:2 to N-methyl-2-pyrrolidone (NMP) which is a solvent to prepare a positive electrode slurry.

The prepared positive electrode slurry was applied on an aluminum metal thin film having a thickness of 15 μm, which is a positive electrode current collector, and then dried. At this time, the temperature of circulated air was 110° C. Thereafter, the aluminum metal thin film applied with the positive electrode slurry and then dried was roll-pressed, and then dried in a vacuum oven at 130° C. for 2 hours to prepare a positive electrode active material layer.

The negative electrode of each of Examples 1 to 6 and Comparative Example 1, the manufactured positive electrode, and a porous polyethylene separator were assembled using a stacking method, and the assembled battery was injected with an electrolyte (ethylene carbonate (EC)/ethyl methyl carbonate (EMC)=1/2 (volume ratio), lithium hexa fluoro phosphate (1 mole of LiPF$_6$) to manufacture a lithium secondary battery.

Each of the lithium secondary batteries were subjected to charge·discharge under the following conditions.

Charge condition: charged to 4.2 V with 0.5 C constant current, and then charged to 4.2 V until 0.1 C current rate flowed Discharge condition: discharged to 3.4 V with 0.5 C current rate Energy density per volume=(battery discharge capacity of each cycle×Nominal voltage from discharge profile)/battery volume at SOC 60%.

Referring to FIG. 3 and FIG. 4, in the case of the battery in which the negative electrode active material of each of Examples 1 to 6 was used, the decrease rate of the energy density thereof was slower than the battery in which the negative electrode active material of Comparative Example 1 was used. Therefore, the phase separation of the silicon was suppressed by the coating layer introduced in the present invention, so that the lifespan properties of the battery was improved.

Furthermore, when comparing Examples 1 to 3, the initial energy density of Example 1 was higher than that of Example 2, and the decrease rate of the energy density of Example 1 was excellent when compared with that of Example 3. This is due to an effect of using a coating material in an appropriate content.

In addition, when comparing Examples 4 to 6, the initial energy density of Example 4 was higher than that of Example 5, and the decrease rate of the energy density of Example 4 was excellent when compared with that of Example 6. This is due to an effect of using a coating material in an appropriate content.

The invention claimed is:

1. A negative electrode active material comprising:
   a core comprising silicon; and
   a coating layer disposed on at least a portion of a surface of the core, the coating layer comprising a coating material,
   wherein the coating material comprises at least one selected from the group consisting of Li$_a$V$_b$O$_2$ in an amount of 5 wt % to 20 wt % and MgH$_2$ in an amount of 2 wt % to 4.5 wt %, wherein 0.5<a<1.5 and 0.5<b<1.5.

2. The negative electrode active material of claim 1, wherein an average particle diameter (D$_{50}$) of the core is 0.05 μm to 100 μm.

3. The negative electrode active material of claim 1, wherein the core consists of silicon.

4. The negative electrode active material of claim 1, wherein the coating material comprises MgH$_2$.

5. A negative electrode comprising:
   a negative electrode current collector; and
   a negative electrode active material layer disposed on a surface of the negative electrode current collector,
   wherein the negative electrode active material layer comprises the negative electrode active material of claim 1.

6. A secondary battery comprising:
   the negative electrode of claim 5;
   a positive electrode;
   a separator interposed between the positive electrode and the negative electrode; and
   an electrolyte.

7. The negative electrode active material of claim 1, wherein the coating layer has a thickness of 0.5 nm to 10 μm.

* * * * *